United States Patent [19]
Tsujimoto

[11] 3,900,857
[45] Aug. 19, 1975

[54] FLASH SYNCHRONIZING CAMERA WITH MECHANICALLY AND ELECTRICALLY TIMED SHUTTER

[75] Inventor: Kayoshi Tsujimoto, Osaka, Japan

[73] Assignee: Minolta Camera Kabushiki Kaisha, Osaka, Japan

[22] Filed: Mar. 1, 1974

[21] Appl. No.: 447,446

[30] Foreign Application Priority Data
Mar. 12, 1973  Japan............................ 48-28673
May 12, 1973  Japan............................ 48-52992

[52] U.S. Cl. .............................. 354/50; 354/139
[51] Int. Cl.² ...................... G03B 7/08; G03B 9/58
[58] Field of Search ............ 354/32, 34, 48, 50, 51, 354/60, 129, 137, 139, 149, 241, 267

[56] References Cited
UNITED STATES PATENTS

| | | | |
|---|---|---|---|
| 3,286,612 | 11/1966 | Lieser | 354/129 |
| 3,535,989 | 10/1970 | Kitai | 354/50 X |
| 3,601,019 | 8/1971 | Kitai | 354/50 X |
| 3,670,635 | 6/1972 | Ort | 354/50 |
| 3,714,873 | 2/1973 | Ernisse et al. | 354/34 X |
| 3,785,259 | 1/1974 | Kitai | 354/34 |

*Primary Examiner*—Joseph F. Peters, Jr.
*Attorney, Agent, or Firm*—Wolder & Gross

[57] ABSTRACT

A focal plane shutter camera includes leading and trailing curtains and a light responsive electronic timer and a mechanical timer which alternatively release the trailing curtain an interval after the release of the leading curtain. The mechanical timer is operative to release the trailing curtain a predetermined interval following the release of the leading curtain and when the full film plane is open, when a photoflash unit is coupled to the camera and the ambient light is inadequate for ordinary photography, or when the electronic timer current supply is deficient, and at other times the electronic timer controls the shutter speed. The mechanical timer may respond to the full discharge of the leading curtain advancing mechanism.

14 Claims, 4 Drawing Figures

FLASH SYNCHRONIZING CAMERA WITH MECHANICALLY AND ELECTRICALLY TIMED SHUTTER

The present invention relates generally to a camera having a focal plane shutter, in which the shutter speed may be automatically set to a flash synchronizing speed, when a flash device is mounted on a camera, and it relates particularly to an electric shutter device, in which in the event that the power source battery is consumed or not loaded in the camera, the shutter is automatically switched from an electric control to a mechanical control which provides a given shutter speed, and in case a flash device is mounted on a camera, when an object is at a brightness which requires flash-photography, even if the power source battery operates normally, the shutter is switched as in the case where the power source battery is consumed, and thus the shutter may be opened under the aforesaid mechanical control, and more particularly, the invention is associated with an electric shutter device, in which the shutter speed under the aforesaid mechanical control is set to a speed which is most frequently used in normal application and adapted for use in synchronism with the flash device.

It is a prerequisite when performing flash-photography with a camera having a focal plane shutter, that the shutter speed be set to such a value that the rear curtain begins travelling only after the forward curtain has reached its fully open position. Otherwise, the entire surface of a film will not be fully exposed, and the flash light will be incident thereon, with part of the film being covered with a shutter curtain, thereby resulting in uneven exposure on an image surface. Accordingly, it is necessary in flash-photography that the shutter speed be set to a speed which is compatible with flash-photograph. However, it so happens that a photographer forgets to set the shutter speed to a proper value, thus resulting in failure to achieve satisfactory pictures.

It is accordingly an object of the present invention to provide a flash-synchronizing, shutter-speed automatic setting camera, in which upon flash-photographing, the shutter speed may be automatically set to a proper flash-synchronizing speed, thereby preventing the aforesaid failure.

It is another object of the present invention to provide a flash-synchronizing, shutter speed automatic camera, in which means for automatically setting such a shutter speed is provided by utilizing means responding to a deficiency in the condition of an electric shutter.

The present mechanism is employed in a shutter device, in which a shutter may be operated at a given shutter speed by being automatically switched to a mechanical control, in the event that the power source battery is consumed or a control switch is not in proper position, whereby the electric shutter may not properly operate. According to the present invention, a switch in an electric shutter system is so designed as to be automatically opened by mounting a flash device on a camera simultaneously therewith, thus simulating the absent condition of a power source battery, whereby the shutter may be switched to a mechanical control to provide a constant shutter speed. Accordingly, if the mounting of the flash device on a camera necessarily brings about setting of a given shutter speed to a flash-synchronizing speed, then the shutter speed will be automatically set to a flash-synchronizing speed.

It is a further object of the present invention to provide an electric shutter device, in which a special shutter control mechanism is not required for synchronization with the flash device and the synchronization at the time of flash-photography may be achieved by utilizing means which respond to abnormal cases of a power source battery in an electric shutter. This aids in providing a simple construction for a shutter mechanism.

The above and other objects and features of the present invention will be clear from a reading of the following description taken in conjunction with the accompanying drawings which illustrate preferred embodiments thereof and wherein:

FIG. 3 is a fragmentary perspective view of the flash unit accessory shoe and the flash synchronizing terminal couplings of another embodiment of the present invention.

Figure 1:
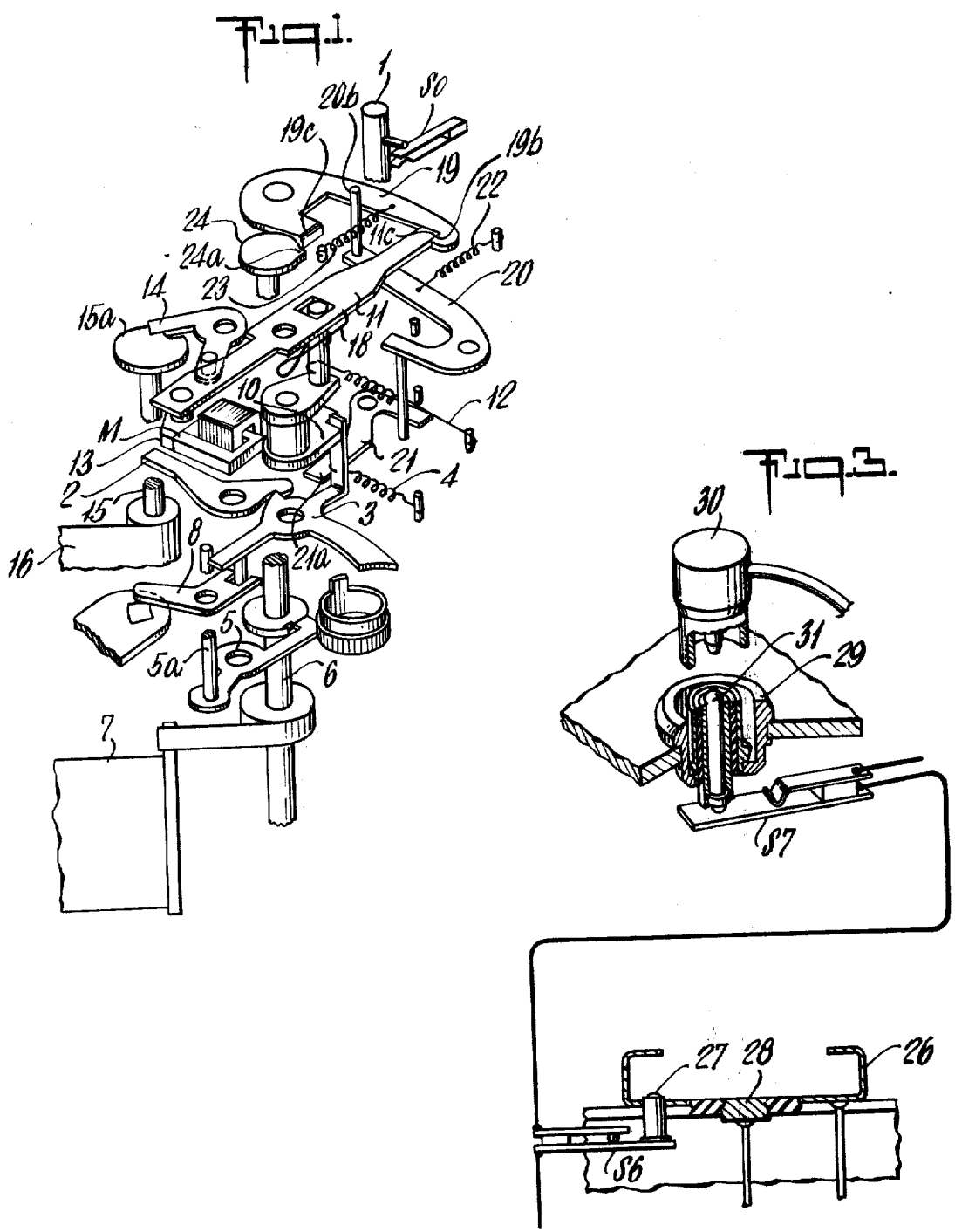
FIG. 1 is a perspective view of a shutter control mechanism embodying the present invention.
Figure 2:
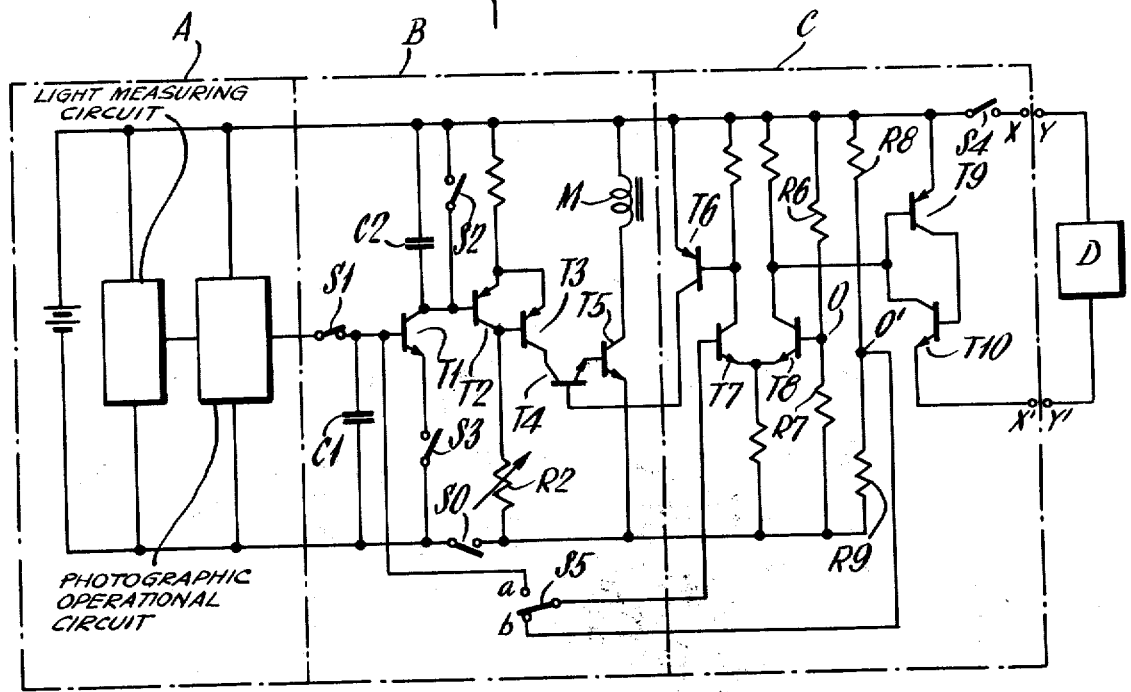
FIG. 2 is a schematic view of the control network thereof.

Referring now to the drawings, particularly FIGS. 1 and 2 thereof which illustrate a first embodiment of the present invention, the reference letter So generally designates a normally open switch which is first closed when a shutter button 1 is depressed and then an electromagnet M is thus excited to thereby attract an iron piece or armature 13 pivoted to the lefthand end of a lever 11, thus maintaining the lever 11 in a position as shown. When the button 1 is further depressed, a mirror (not shown) is swung up and then a lever 2 is rotated in a counter-clockwise direction to be disengaged from the lever 3, such that the lever 3 is rotated under the action of a spring 4 in a clockwise direction. This rotation causes the lever 8 to rotate in a counter-clockwise direction. The aforesaid rotation of the lever 8 is transmitted by way of an upright pin 5a on the lever 5 to the lever 5, whereby the lever 5 becomes disengaged from a winding shaft 6 for the shutter first curtain 7, and thus the shutter first or leading curtain begins travelling. At this time, a timing or delaying operation is commenced in the electric shutter circuit, commensurate to the brightness of the viewed object. On the other hand, the aforesaid clockwise rotation of the lever 3 causes disengagement of the upright end of the lever 3 from the lever 10, such that the lever 10 tends to rotate in a clockwise direction by means of the spring 12 to thereby impart the rotating force to the lever 11 in engagement with the lever 10. In addition, the lever 20 which tends to rotate in a clockwise direction under the action of the spring 22 is so designed as to cooperate by way of an intermediate lever 21 with the upright end of the lever 3. Accordingly, when the lever 3 rotates in a clockwise direction, the intermediate lever 21 is correspondingly rotated by being urged by the lever 20, while the lever 20 is rotated in a clockwise direction. The upright pin 20b on the lever 20 urges an arm 19 to similarly rotate in a counter-clockwise direction, with the result that the arm 19 will be disengaged from the lever 11. As has been described earlier, since the lever 11 has been imparted a rotational force in a clockwise direction, if the lever 11 is disengaged from the arm 19, the lever 11 should have been rotated in a clockwise direction. However, since the iron piece 13 has been attracted to the electromagnet M, the lever remains in a position shown in the drawing and begins rotating when the excitation of the electromagnet M is released after the lapse of time which is determined by the brightness of the viewed object. The rotation of the lever 11 disengages the lever 14 from a disk 15a and then the shaft 1 is freed to cause the shutter second trailing rear curtain 16 to begin travelling.

In case the power source battery is consumed, the electromagnet M will not be excited, even if the switch So is closed by depreseing the shutter button, such that the lever 11 is freed. Meanwhile, when the lever 3 rotates in a clockwise direction, the shutter first curtain 7 begins travelling, while the lever 20 tends to rotate in a clockwise direction due to the clockwise rotation of the lever 3, thereby urging the arm 19 to disengage same from the lever 11, whereas the lever is freed and tends to rotate in a clockwise direction. As a result, there is caused a frictional force by the urging force at the engaging portion of the arm 19 with the righthand end of the lever 11, such that the arm 19 will not be disengaged from the lever 11 under the force of the spring which draws the lever 20. Thus, when the first curtain 7 has travelled to a fully open position, the winding shaft 6 for the first curtain will be rotated through a certain angle, such that the projection 24a on the cam 24 affixed to the top of the shaft 6 urges the portion 19c of the arm 19 away, as viewed in the drawing, to disengage the arm 19 from the lever 11. At this very moment, the lever 11 begins rotation in a clockwise direction to move the levr, thus causing the lever 11 to rotate in a clockwise direction. With such an arrangement, the shutter speed may be switched to such a single speed that the second curtain begins travelling after the full opening of the first curtain, in case the power source battery is not in a sound condition.

As seen in FIG. 2 which illustrates the control network, reference letter A designates a light measuring portion, B a shutter control portion, C a switching control portion and D a flash device. Portions, A, B and C are located on the camera body. Designated at X, X' are synchro-terminals, which are connected to terminals Y, Y' of the flash device D, respectively, and M, shown in portion B, is the electromagnet shown in FIG. 1. The main switch So therein represents the switch So in FIG. 1.

The light measuring portion A consists of a light measuring circuit and a photographic operational circuit, and when the shutter button is despressed, the switch So is closed first. When the flash device D is not mounted, the switch S5 is maintained thrown to the contact b side, such that the output from the light measuring portion A is charged and stored through a switch S1 to a condensor C1, and the switch is then opened before the mirror is swung up. Then the switch S2 is opened, and a switch S3 is closed in cooperation with the commencement of the travelling of the shutter leading first curtain. Then an electric current corresponding to the charged voltage in the condensor C1 flows through a transistor T1 and the condensor C2 is charged thereby. The transistors T2 and T3 constitute a Schmitt circuit. Initially, T2 is maintained interrupted and T3 is conductive. However when C2 is charged to a predetermined voltage, then T2 will be conductive and T3 interrupted, and the shutter speed is thus determined by the time in which the condensor C2 is charged to the aforesaid predetermined voltage.

Transistor T4 serves as a switch to transmit the output from transistor T3 to electromagnet M or vice versa, and is maintained conductive when the flash device is not mounted on a camera, for the reasons which will be described hereinafter. When the Schmidt circuit consisting of transistors T2 and T3 is reversed so as to bring T3 in an interrupted condition, then the transistor T5, which has been kept in conductive condition since the closure of the switch So, will become interrupted, and the excitation of the electromagnet thereby terminates and the trailing second curtain begins travelling to a shutter closed position.

In the switching portion, the transistors T7 and T8 constitute a differential amplifier. Thus, when the flash device is not mounted, the base of T7 is connected to the junction point 0' of resistors R8 and R9, while the base of T8 is maintained connected to the junction point 0 of the resistors R6 and R7. Since the potential at 0' is higher than at 0, T7 is maintained conductive and T8 is interrupted, such that the transistor T6 is maintained conductive and hence T4 is also conductive, whereby the output from T3 may be transmitted to T5.

When the flash device D is mounted in the synchroterminals X, X', the switch S5 will be switched to the contact a side through mechanical cooperation with the flash device D. When the shutter button is depressed, the switch So is closed, and the light measurement is carried out and the output therefrom is stored in condensor C1, while the light measurement output is impressed at the same time by way of switch S5 to the base of a transistor T7, such that the light measurement output is compared with the potential at the junction point 0 of resistors R6 and R7 for its level. Thus, when the potential of the light measurement output is higher than the latter, the operations thereafter will proceed in the same manner as in the case of an ordinary photography. A light measurement output lower in potential than at a point 0 means that an object requires flash-photographing, and in such a case, transistor T7 is maintained interrupted, while T8 is conductive. The interruption of T7 causes T6 and T4 to be interrupted, such that the output from T4 will not be transmitted to T5, and hence T5 is maintained interrupted. As a result, even if the shutter button is depressed and switch So is closed, the electromagnet M will not be excited, whereby there is presented the same condition as the case of a power source which is not in sound condition. Thus, as has been described with reference to FIG. 1, the second curtain begins travelling in cooperation with the full opening of the first curtain. On the other hand, since the transistor T8 is conductive, the transistors T9 and T10 are also conductive, such that the circuit of the flash device D is closed by means of a synchroswitch S4 adapted to be closed, upon completion of the travelling of the first curtain, and thereby the flashing is effected.

Transistor T4 is a switch, whereby the interruption of the transmission of the signal of the shutter control circuit from or to electromagnet M may be effected under the control of the flash-ignition switching circuit. However, even if the transistor T4 is connected to electromagnet M in series or parallel relation, the interruption of the transmission of the signal to M may be effected.

According to the present invention, the flash-synchronizing shutter speed may be controlled to a given speed by means of a shutter mechanism, thereby presenting an advantage of the freedom from the influence of variation in manufacture, and in addition, there results no complicated construction, because of the utilization of the switching mechanism to the mechanical control of a shutter which copes with the case where the electric power source for the electric shutter is not in sound condition.

Furthermore, even if the shutter speed is manually set to a certain value, the shutter speed may be automatically switched to the flash synchronizing speed, without the need to reset a shutter speed manually.

Referring now to FIG. 3, there are shown a synchro-terminal and an accessory shoe portion, the accessory shoe being affixed rigidly to a camera body. When a flash device is mounted on a camera, the flash device is so designed as to press a button 27 projecting into a space defined by the accessory shoe 26, said button 27 being attached to a contact piece of a normally closed switch S6, thereby opening the switch S6. The opening of the switch S6 will bring part of an electric shutter control circuit in an interrupted condition, thereby causing a condition similar to the run-out condition of a power source battery. When a bracket type flash device is used rather than a flash device mounted on an accessory shoe, with a plug 30 of a synchro-cord being inserted in a synchro-terminal 29, then the projection provided on the plug 30 in the center thereof will depress an insulating bar 31 located in the center of the synchro-terminal, thereby opening the switch an associated normally closed switch S7 connected in series with the switch S6. This also causes a condition like a run-out condition of a power source battery.

Figure 4:
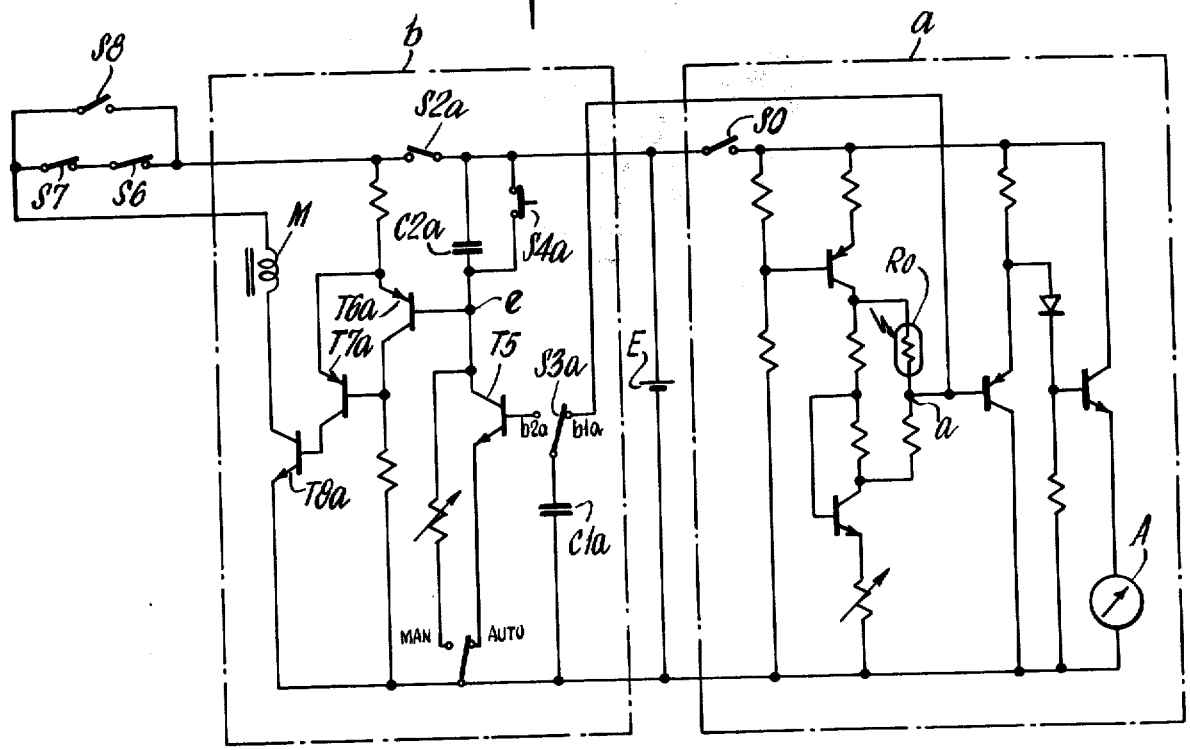
FIG. 4 is a schematic view of the associated control network.

FIG. 4 is a diagram showing the positions of switches S6 and S7 in an electric shutter circuit. However, the present invention is not necessarily to be limited to this electric shutter control circuit. Shown at $a$ is a light measuring circuit, and at $b$ a portion to control a shutter speed depending on the output of the light measurement at the portion $a$. Designated at E is an electric power source used commonly in portions $a$ and $b$ and at M is an electromagnet adapted to operate a shutter. The switches S6 and S7 are of a normally closed type and connected in series with electromagnet M and electric power source E, such that when either of the switches S6 and S7 are opened, the electromagnet will be brought into an inoperable condition. Even in such a case, the electric power source E functions effectively in the light measuring circuit, whereby the result of the light measurement may be indicated on meter A.

The light measuring circuit is operated by closing a switch So. Shown at Ro is a photoconductive element. A light-measuring output is derived at a point $a$ and fed through a contact $b1a$ of a switch S3a to a condensor C1a and stored therein. Upon operation of an ordinary automatic electric shutter, the switch S3a is initially thrown to the contact $b1a$ side, while the switch S2a is kept opened. In the initial phase of the depression of a shutter button, the switch S2a will be closed and the electromagnet will be excited. Then, the switch S4a is opened, and the leading shutter curtain begins travelling, after which the switch S3a will be switched to the contact $b2a$ side, whereby an electric current corresponding to the charge voltage on condensor C1a will flow across a transistor T5a to charge a condensor C2a.

When the condensor C2a is charged to a given level, the switching circuit consisting of transistors T6a and T7a is operated, while the transistor T8a is brought to an interrupted condition and then the electromagnet M is released from excitation, whereby the trailing shutter curtain held by the electromagnet M is released from its locked condition, and thus begins travelling to its shutter closed position. When either of switches S6 and S7 is opened, the electromagnet will not be excited, and thus the shutter mechanism will be operated by means of the mechanical system in the manner of the first embodiment. Provided in parallel to switches S6 and S7 is a normally closed type switch S8 which provides for setting the flash device to FP class. In this case, the switch S8 is closed, and the shutter may be operated by means of an electromagnet M, even if the switches are kept opened.

In ordinary operations controlled by the electric shutter, the shutter mechamism, which is similar to that shown in FIG. 1, operates in the manner described in connection with FIG. 1.

Considering now the case where the switches S6 and S7 are opened and the electromagnet M is not excited, when the lever 3 is rotated in a clockwise direction and the shutter is released, then the lever 3 will be disengaged from the lever 10, whereupon the lever 11 will immediately be rotated in a clockwise direction, since the movable iron piece 13 is not held by the electromagnet M, whereby the trailing curtain will be caused to travel. However, at this time, since the lever 11 is not held by the electromagnet M, the lever 11 is strongly urged under the action of spring 12 by way of the lever 10. As a result, the pressure of the end 11c of the lever 11 exerted on the engaging end 19b of the locking lever 19 will be greater as compared with the case where the electromagnet M is energized, and as a result, the frictional force therebetween is greater. It follows that even if the lever 20 is caused to rotate in a clockwise direction following the lever 3, the engagement of the end 11c with the end 19c is not released under the influence of the spring 22. For this reason, the lever 11 is held by the locking lever 19 rather than by the electromagnet M. When the leading curtain 7 begins travelling and thus the leading curtain shaft 6 begins to rotate, the cam 24 affixed to the top of the shaft 6 is rotated in a clockwise direction, and then the cam projection 24a urges the lefthand end 19c of the locking lever 19 to rotate the lever 19 against the action of the spring 23 in a counter-clockwise direction, thus disengaging the end 11c of the lever 11 from the locking end 19b of the lever 19. Accordingly, the lever is freed and rotated in a clockwise direction under the action of the lever 10 to cause the trailing shutter curtain to travel, as in the case with the automatic shutter.

Since the leading shutter rear curtain is so designed as to be fully opened when the projection 24a acts on the lever 19 by means of adjustment of the rotational angle of the shaft, through which the cam 24 is rotated the shutter speed may be set to a speed such that after the leading shutter curtain has been fully opened, the trailing curtain may begin travelling.

In this manner, in case of the flash-photographing, there may be achieved a constant shutter speed, at which the switches S6 and S7 may be automatically opened, whereby the electromagnet M will not be excited, and yet the trailing curtain begins travelling, after the leading shutter curtain has been fully opened. Thus, the synchronization with the flash photographing may be attained, without resorting to a separate setting operation.

While there have been described and illustrated preferred embodiments of the present invention, it is apparent that numerous alterations, omissions and additions depressed, be made without departing from the spirit thereof.

I claim:

1. In a camera having a focal plane shutter, means for controlling the shutter opening operation, first control means for electrically controlling the shutter closing operation and second control means for mechanically controlling the shutter closing operation with a predetermined delay from the shutter opening operation in place of said first control means at an inoperable condition of said first control means, the combination comprising:

means changeable from a first to a second condition when a flash device is connected with said camera; switching means for causing said first controlling means to be in said inoperable condition with said changeable means in said second condition; whereby the shutter closing operation of said camera is controlled by said second control means when the camera is used with the flash device.

2. The camera as in claim 1, wherein said changeable means comprises a flash-synchronizing terminal socket provided on the camera and a movable member movable between first and second positions, said movable member being pushed from said first into second position by a flash-synchronizing plug of the flash device inserted into said flash-synchronizing terminal socket whereby the condition of said changeable means is changed from said first to second condition.

3. The camera as in claim 2, wherein said switching means comprises a normally closed switch connected in said first control means, said switch being opened with said movable member in said second position to render said first control means inoperable.

4. The camera as in claim 1, wherein said changeable means comprises an accessory shoe provided on the camera and a movable member movable between first and second positions, said movable member being pushed from said first into second position by the flash device mounted to said accessory shoe whereby the condition of said changeable means is changed from said first to said second condition.

5. The camera as in claim 4, wherein said switching means comprises a normally closed switch connected in said first control means, said switch being opened with said movable member in said second position to render said first control means inoperable.

6. The camera as in claim 1, wherein said changeable means comprises a flash-synchronizing terminal socket provided on the camera; an accessory shoe provided on the camera; first and second movable members movable between first and second positions respectively, said first and second movable members being pushed from first into second position by a flash-synchronizing plug of the flash device inserted into said flash-synchronizing terminal socket and the flash device mounted at said accessory shoe respectively, whereby the condition of said changeable means is changed from said first to said second condition with one of said first and second movable member in said second position.

7. The camera as in claim 6, wherein said switching means comprises a pair of terminals connected in said first control means; first and second normally closed switches connected in series with each other between said terminals, said first and second switches being opened with said first and second movable member in said second position respectively whereby an electrical circuit between said terminals is opened to render said first control means inoperable with one of said first and second switches opened.

8. A camera having a focal plane shutter; means for controlling the shutter opening operation; first control means for electrically controlling the shutter closing operation; and second control means for mechanically controlling the shutter closing operation with a predetermined delay from the shutter opening operation when detecting an inoperable condition of said first control means whereby serving as a substitute for the first control means;

characterized in that:

said camera further comprising:

a light measuring circuit; a comparing circuit for comparing the output from said light measuring circuit and a predetermined signal level and having an effective and an ineffective condition, said comparing circuit being related to said first control means so as to cause the first control means to be in said inoperable condition with the output less than the predetermined constant level when the comparing circuit is in said effective condition; means changeable from a first to a second condition when a flash device is connected with said camera; and switching means for switching the condition of said comparing circuit from said ineffective condition into said effective condition with said changeable means in said second condition, whereby the shutter closing operation of said camera is controlled by said second control means when the camera is used with the flash device and the output from said light measuring circuit is less than said predetermined signal level.

9. The camera as in claim 8, wherein said changeable means comprises a flash-synchronizing terminal socket provided on the camera and a movable member movable between first and second positions, said movable member being pushed from said first into second position by a flash-synchronizing plug of the flash device inserted into said flash-synchronizing terminal socket whereby the condition of said changeable means is changed from said first to second position.

10. The camera as in claim 9, wherein said switching means comprises a change-over switch connected with said comparing circuit, said change-over switch being changed with said movable member in said second position to change the condition of said comparing circuit from an ineffective to an effective state.

11. The camera as in claim 8, wherein said changeable means comprises an accessory shoe provided on the camera and a movable member movable between first and second positions, said movable member being pushed from said first into said second position by the flash device mounted at said accessory shoe whereby the condition of said changeable means is changed from said first into second condition.

12. The camera as in claim 11, wherein said switching means comprises a change-over switch connected with said comparing circuit, said change-over switch being changed with said movable member in said second position to change the condition of said comparing circuit from ineffective into effective.

13. A camera having a focal plane shutter including leading and trailing screens moveable between cocked and discharged positions, light responsive electrical first timing means for releasing said trailing screen an interval following the release of said leading screen, mechanical timing means responsive to an inoperative state of said first timing means for releasing said trailing screen a predetermined interval following the release of said leading screen, means responsive to the coupling of a flash unit to said camera for disabling said first timing means so that the release of said trailing screen is controlled by said mechanical timing means when said flash unit is coupled to said camera, and means responsive to the light incident on said light responsive electrical first timing means exceeding a predetermined value for ineffectuating said disabling means.

14. A camera having a focal plane shutter including leading and trailing screens moveable between cocked and discharged positions, light responsive electrical first timing means for releasing said trailing screen an interval following the release of said leading screen, mechanical timing means responsive to an inoperative state of said first timing means for releasing said trailing screen a predetermined interval following the release of said leading screen, means responsive to the coupling of a flash unit to said camera for disabling said first timing means so that the release of said trailing screen is controlled by said mechanical timing means when said flash unit is coupled to said camera, said first timing means comprising a current source and a switch connected in series between said current source and said first timing means, and said disabling means comprising means for opening said switch in response to the coupling of said flash unit to said camera.

* * * * *